Figure 4:
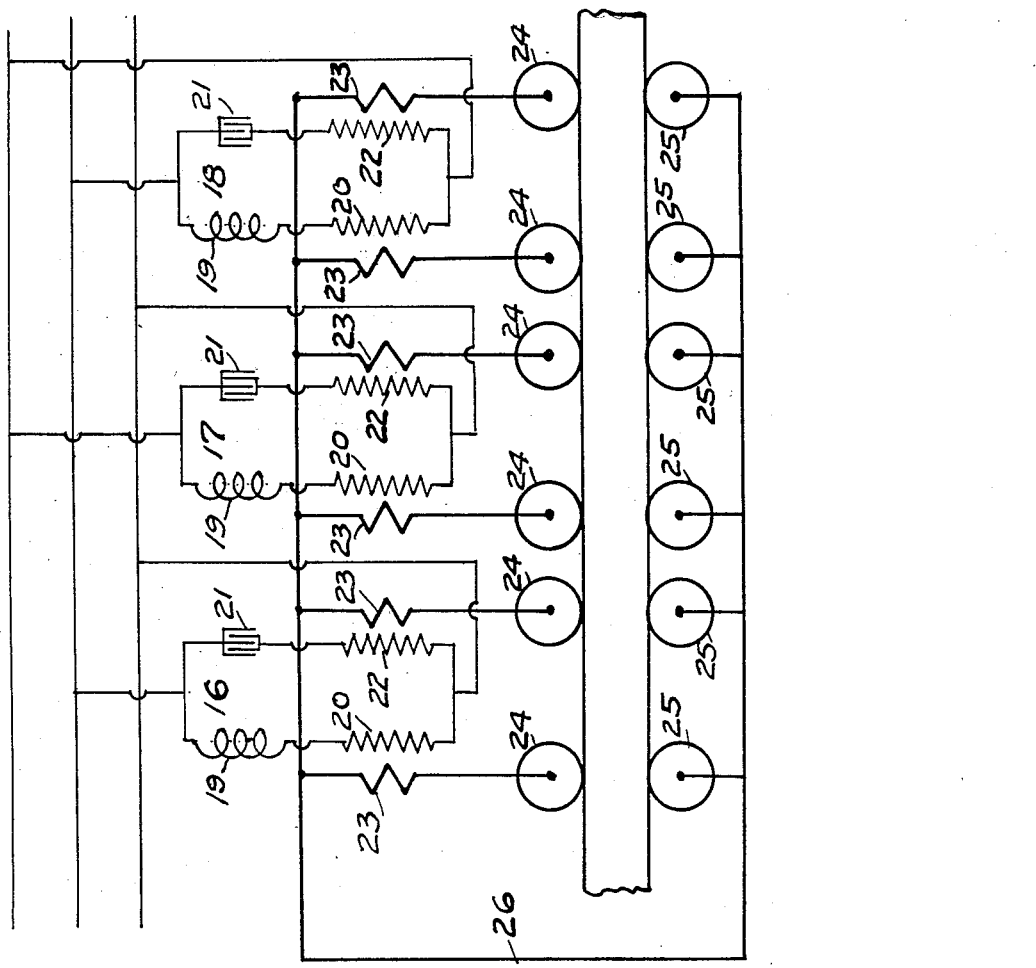

March 17, 1936. C. N. MITCHELL 2,034,411
APPARATUS FOR ELECTRIC WELDING
Original Filed Nov. 24, 1930 2 Sheets-Sheet 1
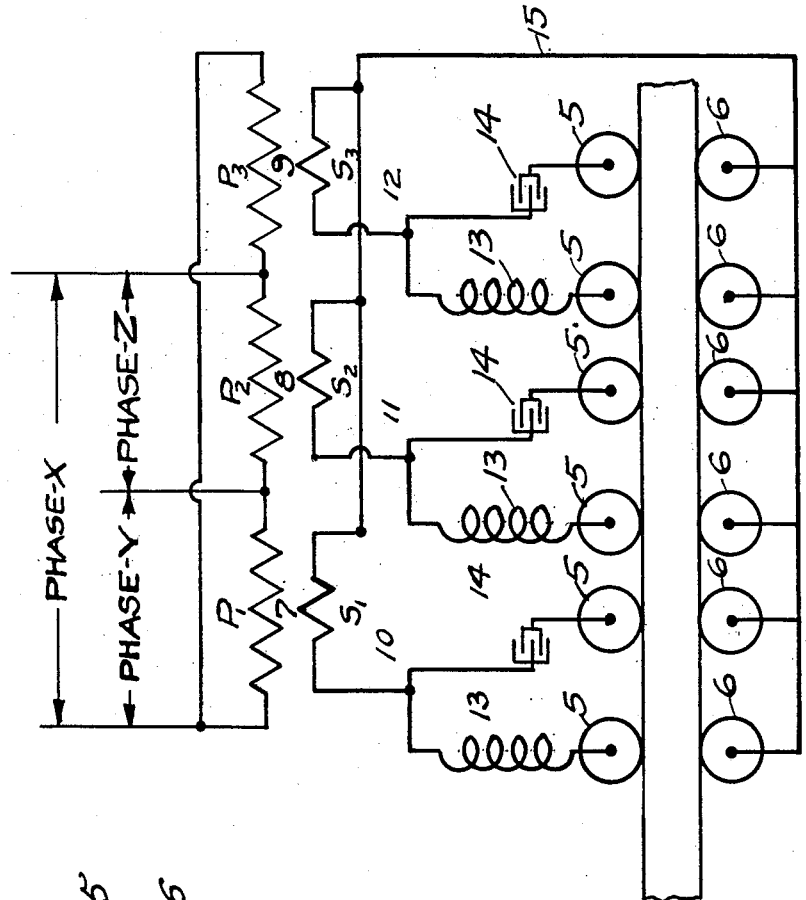
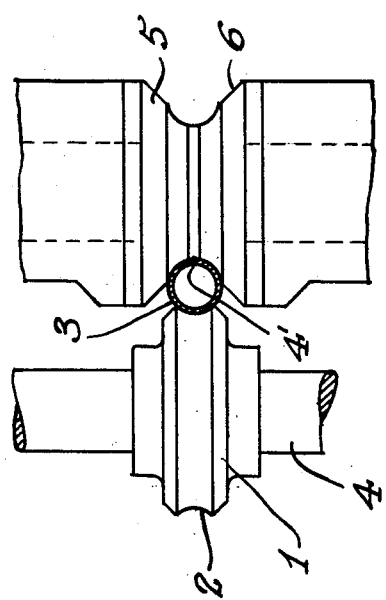
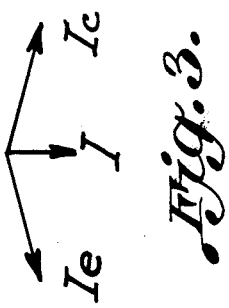
INVENTOR.
Courtney N. Mitchell
BY
Fay, Oberlin & Fay
ATTORNEYS Patented Mar. 17, 1936

2,034,411

UNITED STATES PATENT OFFICE 2,034,411

APPARATUS FOR ELECTRIC WELDING

Courtney N. Mitchell, Strongsville, Ohio

Application November 24, 1930, Serial No. 497,626
Renewed July 18, 1935

7 Claims. (Cl. 219—4)

This invention relates as indicated to a method and apparatus of electric welding, and has specific reference to a method and apparatus for welding metallic articles by means of alternating current, and will be best understood by having reference to my co-pending application Serial No. 430,694 filed Feb. 24, 1930. As will be noted from a careful examination of the apparatus illustrated, described and claimed in the aforesaid application, I propose to accomplish the welding of the seam in the metallic articles by having a plurality of paired electrodes in the form of rollers and the like contact with the juxtaposed material forming the seam to be welded and across which the surge of the welding current is caused to flow to effect intermittent welds which, as stated in the aforesaid application, will be so arranged that the welds produced by the plurality of electrodes will occupy adjacent positions in the finished articles, so that a substantially continuous welded seam will result.

It is among the objects of this invention to provide a method of electric welding which, while based in the general principles of operation of the mechanism disclosed in the aforesaid application, yet accomplishes the same result with greater efficiency and other advantageous results which will become apparent as the description proceeds. Another object of this invention is to provide a means of welding metallic articles such as tubing or the like by the use of alternating currents, whereby circuits of high intensity are made to flow between the welded electrodes without the necessity of passing such current through the transformers usually employed and other parts of the wiring system. In the method of electric welding which is about to be described, I propose to take advantage of the well known phenomena of resonance so as to dispense with the necessity of employing a multi-phase transformer as illustrated in my aforesaid co-pending application. If an inductive resistance and a condenser are placed in parallel circuits between the mains of an alternating current supply system, and the leads from each of such units then connected to separate welding electrodes, and the resultant circuit tuned by a proper proportioning of the capacity of the condenser, and the value of the inductance, the phenomena of resonance in such circuit will occur. The current through the condenser being a leading current, and the current through the inductance being a lagging current, all of the hereinafter described advantages may be attained which have heretofore never been applied or employed for the desirable result achieved by my invention. Other objects of my invention will appear as the description proceeds.

To the accomplishment of the foregoing and related ends, said invention, then, consists of the means hereinafter fully described and particularly pointed out in the claims. The annexed drawings and the following description setting forth in detail certain mechanism embodying the invention, such disclosed means constituting, however, but one of various mechanical forms in which the principle of the invention may be used.

In said annexed drawings:

Fig. 1 is a fragmentary elevational view of a portion of the apparatus employed in carrying out the method comprising my invention; Fig. 2 is a wiring diagram of the circuit employed in the method comprising my invention; and Fig. 3 is a vector diagram showing the phase relations of the current in different branches of the circuit illustrated in Fig. 2. Fig. 4 is a diagram representing an alternative arrangement of the elements employed in the application of my invention.

Referring more specifically to the drawings and more especially to Fig. 1, the apparatus here illustrated is a portion of the apparatus disclosed in my aforesaid co-pending application and consists of a roller 1 provided with an arcuate peripheral groove 2 adapted to contact with, and support the tube 3 to be welded. The roller 1 is mounted on a suitable shaft 4 and may rotate freely thereon as the tube 3 is driven through the apparatus, or the roller may be secured to such shaft and the tube propelled thereby. The seam 4 of the tube to be welded is so positioned that the rollers 5 and 6 forming the welding electrodes will contact with the tube on the opposite sides of such seam. It will be noted that the rollers have their peripheries formed with complementary circumferential grooves so that the periphery of the tube is properly supported and engaged thereby. During the welding operation hereinafter more fully described, the current will flow from one of the rollers 5 and 6 to the other through the tube 3 across the seam 4, and in so flowing across such seam will cause the adjacent edges thereof to be welded together.

Referring more specifically to Fig. 2, it will be noted that the usual three-phase alternating current, consisting of phases X, Y and Z is employed. Each of such phases having connected thereacross the primary windings $P_1$, $P_2$ and $P_3$ of transformers 7, 8 and 9. The secondary windings of these transformers have been given the usual designating reference characters S₁, S₂ and S₃.

One of the leads, such as 10, 11 and 12 from the secondary windings of the transformers have connected thereto and arranged in parallel, inductive resistance units such as 13 and condensers such as 14. The separate leads from the several inductance and capacity units are in turn separately connected to welding electrodes such as the wheels 5 which contact with the tube to be welded along one side of the seam. The wheels or electrodes 6 which contact with the tube along the seam opposite to the point of contact of the wheels 5 are interconnected by means of a common lead such as 15, which in turn, in common connection with the opposite ends of the secondary windings of the transformers. The vector diagram of Fig. 3 illustrates the current relations for one set of condenser and inductance value. The horizontal line I represents the current in the line 10. The line $I_c$ represents the current from the condenser 14 and the line $I_e$ represents the current passing through the inductance 13. By proper proportioning of the inductance and capacity values, $I_c$ may be maintained at nearly 180° from $I_e$, so that the welds produced by the current through the condenser will occur nearly a half a cycle ahead of the welds produced by the current flowing through the inductance, while the impressed current I will be relatively small. The voltage impressed on the system will be of sufficient value to maintain the proper welding currents so that it is obvious that currents of moderate value may be maintained through the transformers in this manner.

In the alternative form of construction shown in Fig. 4, the inductance and capacity units are placed in parallel circuits across the power lines of any alternating current system, there being three pairs, 16, 17 and 18 of inductance and capacity units for the three phase source of power shown. In series with each inductance 19 is a transformer primary element 20 and in series with each condenser 21 is a corresponding transformer primary 22. Associated with each primary is its corresponding secondary 23 which furnishes current to each electrode 24, the return circuit being through the electrodes 25 on the opposite side of the seam cleft and the circuit 26. The usual three phase power line will thus provide six welding circuits, each of which will furnish two current impulses per cycle across the seam cleft, which is double the number of impulses ordinarily available with a three phase source. With this arrangement twice as many transformers will be required as in the arrangement shown in Fig. 2, thus adding to the cost of equipment. This however, is off-set to a considerable extent by the saving which may be effected in the size of condensers required.

It will be noted from the above description that by employing the method comprising my invention the method of welding tubing by the principles and with the apparatus disclosed in my aforesaid co-pending application, and other apparatus sometimes employed for this purpose may be accomplished in a manner having advantages and an efficiency greater than any heretofore employed. It is believed that a further description comprising the principles of my invention will be unnecessary for those familiar with the art of alternating current electric welding.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In apparatus for electric welding, the combination of two pairs of electrodes, each pair adapted to movably contact with the work on opposite sides of the seam cleft, conductor means electrically interconnecting said paired electrodes in parallel, an inductance unit in series with one of such pairs of electrodes, and a capacity unit in series with the other said pair of electrodes.

2. In apparatus for electric welding, the combination of a plurality of paired welding electrodes in movable contact at spaced points with the work along one side of the seam, the electrodes of each pair being connected in parallel; an inductance unit in series with one of each of said paired electrodes; a capacity unit in series with the other electrode of such pairs; and a plurality of electrically interconnecting electrodes contacting with the work at spaced points opposite the seam cleft from said first named electrodes.

3. In apparatus for electric welding, the combination of two pairs of electrodes, each pair adapted to movably contact with the work on opposite sides of the seam cleft, conductor means interconnecting said pairs of electrodes, an inductance and a transformer element in the circuit of one pair of electrodes, and a capacity and a transformer element in the circuit containing the other pair of electrodes.

4. In apparatus for electric welding, the combination of two pairs of electrodes, each pair adapted to movably contact with the work on opposite sides of the seam cleft, conductor means connected with one of each pair of electrodes, a transformer secondary in series with each of said pairs of electrodes, the primary of the transformer of one pair in series with an inductance, and the primary of the transformer of the other pair in series with a capacity.

5. In apparatus for electric welding, the combination of two pairs of electrodes, each pair adapted to movably contact with the work on opposite sides of the seam cleft, conductor means connected with one of each pair of electrodes, a resonant circuit of two branches connected to a source of current, a transformer in each branch of said resonant circuit, and said transformer connected with the aforesaid conductor means.

6. In apparatus for electric welding, the combination of paired electrodes, each pair being adapted to contact with opposite sides of a seam cleft, conductor means connected with one of each pair of electrodes, an inductance and a transformer element in the circuit of one pair of electrodes, and a capacity and a transformer element in a circuit containing another pair of electrodes.

7. In apparatus for electric welding, the combination of paired electrodes, each pair being adapted to contact with opposite sides of a seam cleft, conductor means for supplying current to said electrodes, an inductance and transformer in circuit with one of said electrodes, and a capacity and a transformer in circuit with another of said electrodes.

COURTNEY N. MITCHELL.